United States Patent [19]
Vengsarkar et al.

[11] Patent Number: 5,802,234
[45] Date of Patent: Sep. 1, 1998

[54] DISPERSION COMPENSATING OPTICAL FIBER, AND COMMUNICATION SYSTEM COMPRISING SAME

[75] Inventors: Ashish Madhukar Vengsarkar, Berkeley Heights, N.J.; Jefferson Lynn Wagener, Charlottesville, Va.

[73] Assignee: Lucent Technologies, Inc, Murray Hill, N.J.

[21] Appl. No.: 821,507

[22] Filed: Mar. 21, 1997

[51] Int. Cl.$^6$ ................................................. G02B 6/10
[52] U.S. Cl. .................. 385/123; 385/127; 385/142; 385/144
[58] Field of Search ................................ 385/123, 126, 385/127, 128, 141, 142, 144, 28

[56] References Cited

U.S. PATENT DOCUMENTS

| | | | |
|---|---|---|---|
| 5,185,827 | 2/1993 | Poole | 385/28 |
| 5,261,016 | 11/1993 | Poole | 385/28 |
| 5,448,674 | 9/1995 | Vengsarkar et al. | 385/123 |
| 5,555,340 | 9/1996 | Onishi et al. | 385/127 |
| 5,568,583 | 10/1996 | Akaska et al. | 385/123 |
| 5,581,647 | 12/1996 | Onishi et al. | 385/123 |

OTHER PUBLICATIONS

"Calculation of Modes in an Optical Fiber Using the Finite Element Method and EISPACK", by T. A. Lenahan, *The Bell System Technical Journal*, vol. 62, No. 9, Part 1, Nov. 1983, pp. 2663–2694.

*Primary Examiner*—John Ngo
*Attorney, Agent, or Firm*—Eugen E. Pacher

[57] ABSTRACT

Known dispersion-compensating (DC) optical fibers typically are sensitive to small changes in fiber parameter (e.g., fiber diameter and/or core refractive index), and thus are difficult to manufacture. The disclosed DC fibers are relatively insensitive to small departures from the nominal fiber parameters, and are therefore more manufacturable. Exemplarily, the nominal refractive index profile of a DC fiber is selected such that the fiber supports $LP_{01}$ and $LP_{02}$ (and typically one or more further higher order modes), and the dispersion is substantially all in $LP_{02}$. The total dispersion is more negative than −200 ps/nm.km over a relatively wide wavelength range. The nominal refractive index profile typically comprises a refractive index "ring" that is spaced from the fiber core.

8 Claims, 4 Drawing Sheets

DISPERSION COMPENSATING OPTICAL FIBER, AND COMMUNICATION SYSTEM COMPRISING SAME

FIELD OF THE INVENTION

This invention pertains to dispersion compensating optical fiber, and to optical fiber communication systems that comprise such fiber.

BACKGROUND

Dispersion compensating (DC) optical fibers are known. See, for instance, U.S. Pat. Nos. 5,185,827, 5,261,016 and 5,448,674. The prior art discloses dispersion compensation by a technique that comprises conversion of the $LP_{01}$ (fundamental mode) radiation of conventional single mode fiber to a higher order mode (e.g., $LP_{02}$), coupling the higher order mode radiation into a length of DC fiber and, after transmission through the DC fiber, reconverting the radiation to the $LP_{01}$ mode. The DC fiber is selected such that it guides the higher order mode, and such that the dispersion of the higher order is of the opposite sign from the dispersion of the $LP_{01}$ mode in the conventional single mode fiber. The prior art also discloses dispersion compensation by a technique that does not require conversion of $LP_{01}$ radiation to higher mode radiation, and that instead uses DC fiber that supports propagation of the signal radiation in both the fundamental mode and a higher order mode (typically $LP_{02}$). The latter prior art DC fiber does not support propagation in the $LP_{11}$ mode. See U.S. Pat. No. 5,448,674.

Prior art techniques of dispersion compensation can in principle provide an essentially completely dispersion-free (single channel) optical fiber transmission system. However, in practice it is difficult to obtain essentially complete compensation, since known designs of DC fiber are very sensitive to manufacturing variations, e.g., variations in fiber diameter and/or refractive index profile. It is typically possible to maintain the fiber diameter (and therefore all radial fiber dimensions) to within ±1% of the nominal value, and to maintain the core refractive index within limits such that $\Delta$ is within ±2% of the nominal value. The parameter $\Delta$ is defined below.

Those skilled in the art are well aware of the practical impossibility of producing optical fiber that is completely free of unintended variations of fiber characteristics such as fiber diameter or core refractive index. Thus, it would be highly desirable to have available DC fiber that is less subject to unintended variations of fiber characteristics than typical prior art DC fiber. This application discloses such a fiber, and communication systems that comprise the fiber.

SUMMARY OF THE INVENTION

In a broad aspect the invention is embodied in a DC fiber (and in an optical fiber communication system that comprises the DC fiber; collectively "article") that is relatively immune to unintended variations in fiber diameter and/or refractive index, and thus is more readily manufacturable than typical prior art DC fibers.

More specifically, the invention is embodied in an article that comprises a length of DC optical fiber that supports radiation of wavelength $\lambda_o$ (e.g., 1.55 μm) in a fundamental mode $LP_{01}$ and a higher order mode. The DC fiber has a nominal refractive index profile comprising a core of diameter $d_{c,nom}$ and maximum refractive index $n_{c,nom}$, and that further comprises a cladding region that contactingly surrounds the core and has a refractive index $n_{1,nom}$ that is less than $n_{c,nom}$. The quantity $(n_{c,nom}-n_{1,nom})/n_{c,nom}$ is designated $\Delta_{nom}$.

At least a portion of the length of DC fiber has a refractive index profile that differs from the nominal refractive index profile, typically due to unintended variations during fiber manufacture. The refractive index profile of the portion includes a core of diameter $d_c$ and maximum refractive index $n_c$, and further includes an inner cladding region that contactingly surrounds the core and has refractive index $n_1$, with $(n_c-n_1)/n_c$ designated $\Delta$. At least one of $d_c$, $n_c$ and $\Delta$ differs from $d_{c,nom}$, $n_{c,nom}$ and $\Delta_{nom}$, respectively. DC fiber having the nominal refractive index profile has dispersion $D_{nom}(\lambda)$, and the portion of the length of DC fiber has dispersion $D(\lambda)$ that differs from $D_{nom}(\lambda)$.

Significantly, the nominal refractive index profile is selected such that the length of DC fiber supports $LP_{01}$ and at least the higher order mode $LP_{02}$ at $\Delta_o$, and $D_{nom}(\lambda)$ is more negative than $-200$ ps/nm.km over a wavelength range $\lambda_{max} \pm 50$ nm, where $\lambda_{max}$ is the wavelength at which $|D_{nom}(\lambda)|$ is maximum. Furthermore, $|D(\lambda)-D_{nom}(\lambda)|$ is less than $|0.5\ D_{nom}(\lambda)|$ at every wavelength $\lambda$ in the range $\lambda_{max} \pm 50$ nm, for specified departures of the refractive index profile from the nominal refractive index profile. Specifically, the above inequality is satisfied for $d_c$ that differs from $d_{c,nom}$ by 1% or less, or for $\Delta$ that differs from $\Delta_{nom}$ by 2% or less, or for $d_c$ and $\Delta$ that differ from $d_{c,nom}$ and $\Delta_{nom}$ by 1% or less and 2% or less, respectively. Still furthermore, $\lambda_o$ is a wavelength in the range $\lambda_{max} \pm 50$ nm. As is conventional, the vertical bars around a quantity (e.g., $|0.5\ D_{nom}(\lambda)|$) signify the absolute value of the quantity.

The DC fiber typically supports, at the wavelength $\lambda_o$ not only $LP_{01}$ and $LP_{02}$ but also one or more further higher order modes. The latter higher order modes typically are close to cut-off and are very sensitive to bending loss, typically resulting in their removal from the fiber. An optical fiber "supports" a given mode if the effective index of the mode is greater than the refractive index of the cladding of the fiber.

The nominal refractive index profile preferably comprises a refractive index "ring" of inner diameter $d_{1,nom} > d_{c,nom}$ and outer diameter $d_{2,nom}$, and a refractive index $n_{2,nom}$ selected such that $(n_{2,nom}-n_{2,nom})/n_{2,nom} > 0.1\%$, preferably greater than 0.2%. Furthermore, $d_{c,nom}$ and $\Delta_{nom}$ typically are selected such that $(n_{c,nom} \cdot d_{c,nom} \cdot \sqrt{\Delta_{nom}})/\lambda_o$ is greater than 0.55, indicative of fiber that supports several modes.

In embodiments for $\lambda_o \sim 1.55$ μm, wherein the dispersion-compensating fiber is silica-based fiber with Ge-doped core, the nominal refractive index profile is equivalently selected such that $d_{c,nom} \cdot \sqrt{\Delta_{nom}}$ is greater than 0.6 μm.

The core, inner cladding region and index ring of the DC fiber will typically consist of glass formed in situ by any one of the conventional methods, e.g., MCVD. Frequently but not necessarily, the index ring is surrounded by an outer cladding of in situ formed glass, having outer diameter $d_3$ and a refractive index $<n_2$, typically $n_1$. The remainder of the fiber typically is pre-existing glass extending from $d_3$ to the fiber surface. If attainment of minimum loss is not a significant consideration, then the index ring could be directly deposited on the inside of the cladding tube, i.e., $d_3=d_2$.

The outside diameter of the fiber exemplarily is 125 μm. The fiber typically is silica-based, with the pre-existing glass typically being undoped silica, and the inner cladding and optional outer cladding exemplarily also being undoped silica, or being down-doped (e.g., F-doped) silica. Since the outer portions of the fiber cladding typically do not significantly affect the transmission characteristics of the fiber, we do not distinguish between nominal and actual diameters and refractive indices for these portions.

DETAILED DESCRIPTION OF SOME PREFERRED EMBODIMENTS

Figure 1:
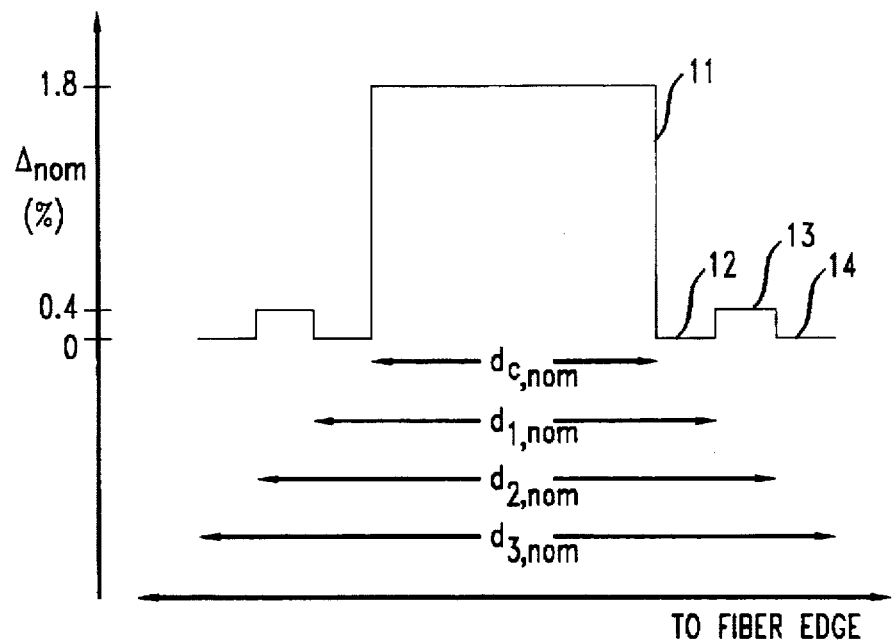
FIG. 1 schematically shows the refractive index profile of an exemplary DC fiber according to the invention.

FIG. 1 shows the nominal refractive index profile of an exemplary DC fiber according to the invention. As those skilled in the art know, actual profiles typically depart somewhat from the nominal or ideal profile, but the departures typically can be kept within limits such that the fiber exhibits the desired characteristics. For instance, actual fibers typically exhibit a central refractive index depression that is typically not present in the corresponding nominal profile, yet the fibers generally perform according to the design specifications.

In FIG. 1, numerals 11–14 refer, respectively, to the core, the inner cladding region that contactingly surrounds the core, the refractive index ring, and an outer cladding region that surrounds the index ring. The fiber typically comprises a further cladding region that is not shown, and that typically is spaced far enough from the core to be essentially optically inactive. The material typically is undoped silica, and extends to the fiber edge from a (non-critical) outer diameter $d_3$ of outer cladding 14. In a preferred embodiment, $d_{c,nom}$= 8.4 µm, $d_{1,nom}$=14.55 µm, $d_{2,nom}$=25.5 µm, and $d_3$ is about 30 µm. The fiber diameter is 125 µm, as is conventional.

In FIG. 1, the core has a step profile, with $\Delta_{nom}$=1.8%. The step core profile is chosen to provide substantial dispersion. This choice, however, is optional, and other core profiles (e.g., parabolic profile) could be used if desired, e.g., to minimize signal attenuation. The refractive index ring desirably has refractive index $n_{2,nom}$ selected such that $(n_{2,nom}-n_{2,nom})/n_{2,nom}$>0.1%, exemplarily, 0.4%, and cladding regions 12 and 14 have refractive index<$n_{2,nom}$, typically but not necessarily the same in both regions. The refractive indices of regions 12 and 14 could be that of undoped silica ($n_o$), or could be less than $n_o$ due to F-doping. The latter is preferred, since it makes possible lower core doping.

A further exemplary DC fiber according to the invention has a parabolic index core ($d_{c,nom}$=12.6 µm, $\Delta_{nom}$=1.8%), $d_{1,nom}$=20 µm, $d_{2,nom}$=34.6 µm, $d_3$ is about 40 µm, with fiber outside diameter of 125 µm. The index ring has refractive index $n_{2,nom}$ selected as above, with $(n_2-n_1)/n_2$=0.4%, and the inner and outer cladding regions (corresponding to regions 12 and 14 of FIG. 1) have refractive index $n_{1,nom}$.

DC fiber according to the invention is designed to primarily use the $LP_{02}$ mode for dispersion compensation, since near cut-off the $LP_{02}$ mode can have high (negative) dispersion, desirably more negative than −200 ps/nm.km. Fibers that have dispersion less negative than −200 ps/nm.km are generally not as useful as dispersion-compensating fiber as are more dispersive fibers. Fiber according to the invention can be produced by conventional fiber manufacturing techniques, e.g., by MCVD.

Figure 2:
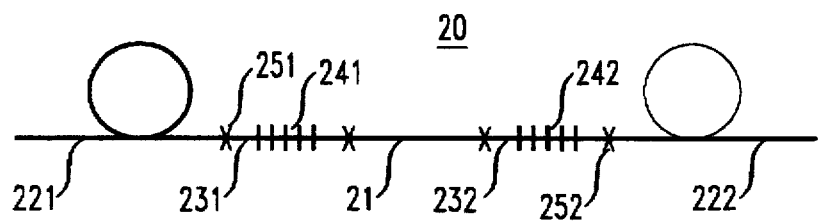
FIG. 2 schematically shows a portion of an optical fiber communication system, the portion comprising a dispersion compensator.

FIG. 2 schematically depicts a DC fiber according to the invention, with associated input and output means. The combination 20 comprises a predetermined length (typically a km or more) of DC fiber 21, standard single mode input and output fibers ("pigtails") 221 and 222, and gratings 241 and 242 selected to act as mode converters. The gratings will generally be long period gratings. Input grating 241 is selected to convert incoming $LP_{01}$ radiation to $LP_{02}$ radiation, and output grating 242 is selected to convert outgoing $LP_{02}$ radiation to $LP_{01}$ radiation. Long period gratings are known to those skilled in the art and do not require further elaboration. The gratings will typically be formed in short lengths (231 and 232) of fiber that supports both $LP_{01}$ and $LP_{02}$. Exemplarily this could be DC fiber according to the invention. However, at least in principle, the gratings could be formed directly in the predetermined length of DC fiber 21, with the spacing between the two gratings being the effective length of the DC fiber. In FIG. 2, the "x" symbols refer to conventional splices. The splices between fibers 231 and 21, and between 21 and 232, are optional. Splices 251 and 252 are between single mode fiber and fiber that additionally supports one or more higher order modes, and should substantially only couple $LP_{01}$ to $LP_{01}$.

The appropriate length of the DC fiber is determined in conventional fashion so as to compensate the dispersion of a given length of conventional single mode transmission fiber.

Figure 3:
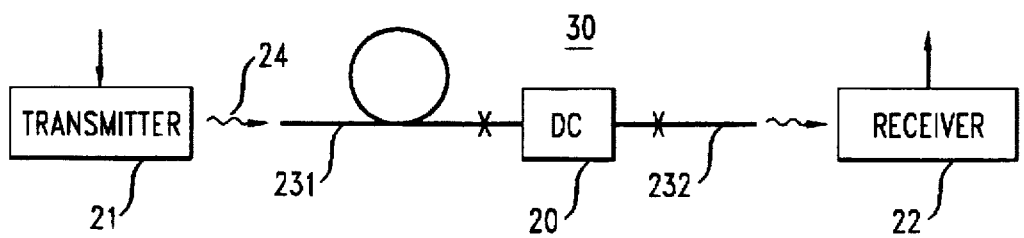
FIG. 3 schematically shows an optical fiber communication system that comprises a dispersion compensator.

FIG. 3 schematically depicts an exemplary optical fiber communication system 30 that comprises a combination 20 according to the invention. Transmitter 21 provides modulated signal radiation 24 at wavelength λ. The radiation is coupled into transmission fiber 231, propagates to dispersion compensator 20, undergoes dispersion compensation, followed by transmission through optional transmission fiber 232 to receiver 22. Conventional components such as amplifiers, filters, isolators, routers etc. are not shown.

It will be understood that, at least in principle, dispersion compensation can take place at any point in an optical fiber communication system. However, in many cases there will be dispersion compensation just before detection of the signal.

Fiber according to the invention not only can be used for dispersion compensation but can also be designed to provide dispersion slope compensation over a range of wavelengths, exemplarily a range greater than 10 nm and including $\lambda_o$.

As mentioned above, DC fiber according to the invention has the desirable property of relative immunity with respect to (typically unavoidable) minor parameter variations.

Figure 4:
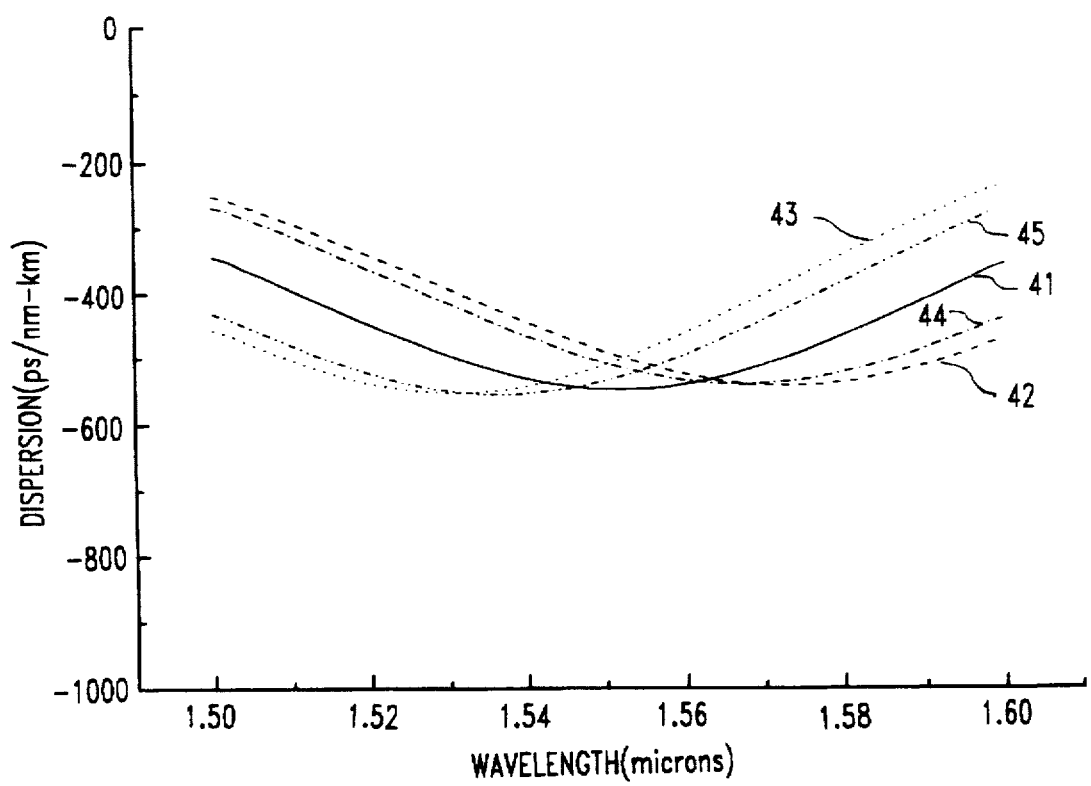
FIG. 4 shows data on dispersion vs. wavelength for DC fiber according to the invention.

FIG. 4 pertains to DC fiber substantially as shown in FIG. 1, with curve 41 showing the nominal dispersion $D_{nom}(\lambda)$ of fiber with the nominal refractive index profile (i.e., parameters as shown in FIG. 1). Curves 42 and 43 show the dispersion of fiber with Δ respectively increased by 2% and decreased by 2% from $\Delta_{nom}$. Curves 44 and 45 show the dispersion of fiber with outside diameter (and therefore all radical dimensions) respectively increased 1% and decreased 1% from the nominal value. As can be seen from FIG. 4, the departures of the dispersion from $D_{nom}(\lambda)$ over the range $\lambda_{max}\pm50$ nm are relatively small, less than 50%.

Figure 5:
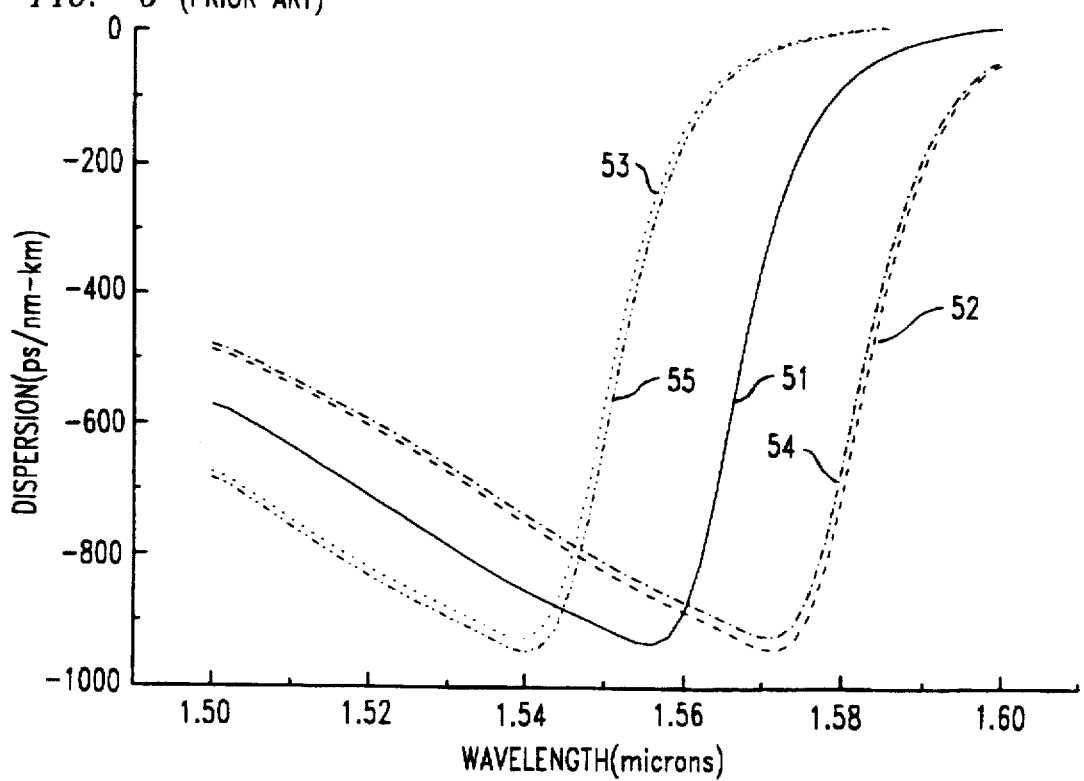
FIG. 5 shows data on dispersion vs. wavelength for an exemplary prior art DC fiber.

The results of FIG. 4 should be compared with those of FIG. 5, which shows dispersion data for an exemplary prior art DC fiber, with step index core (7.1 μm diameter, 1.8% Δ), without index ring. Curve 51 shows the dispersion of the nominal fiber (i.e., parameters as stated above), curves 52 and 53 show the dispersion of fiber with Δ respectively increased by 2% and decreased by 2% from the nominal design, and curves 54 and 55 show the dispersion of fiber with outside diameter respectively increased 1% and decreased 1% from the nominal design. Clearly, the exemplary prior art fiber is much more sensitive to parameter variations than is the exemplary DC fiber according to the invention.

Figure 6:
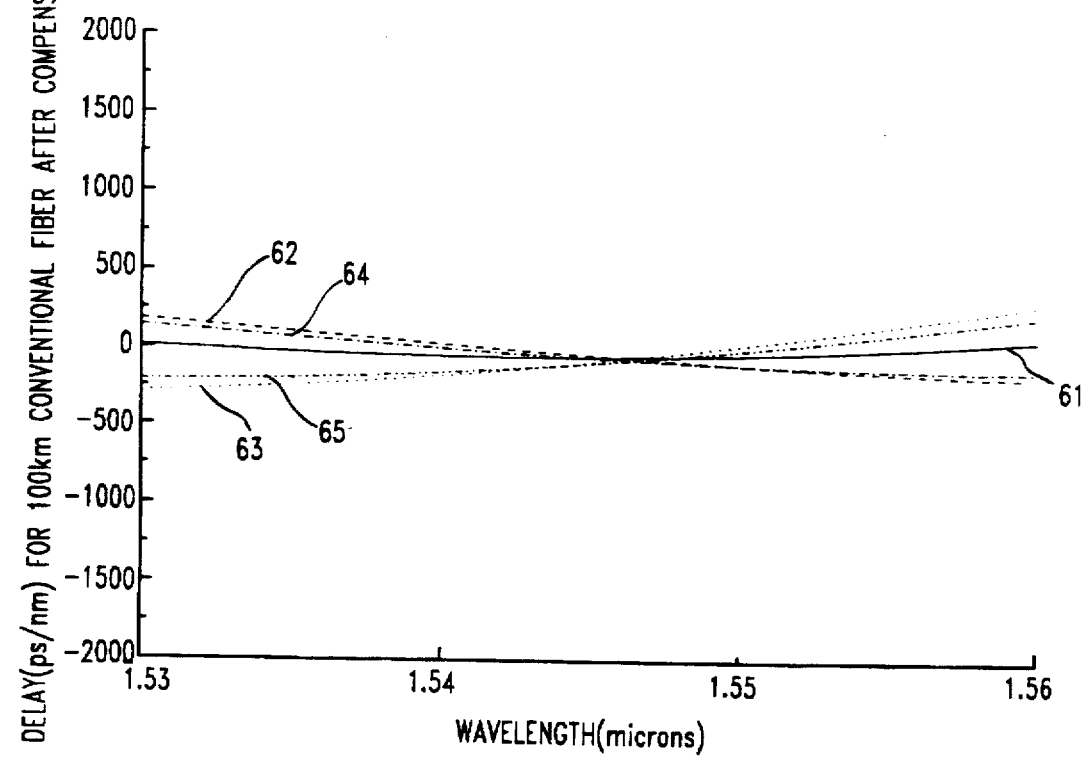
FIG. 6 shows data on delay vs. wavelength for the combination of 100 km of conventional transmission fiber and a length of DC fiber according to the invention.

FIG. 6 shows the total delay for 100 km of commercially available single mode transmission fiber (5D® fiber) together with an optimal length of DC fiber substantially as shown in FIG. 1. By "optimal length" we mean the length of DC fiber that yields the minimum delay at the operating wavelength. Curve 61 shows the delay spectrum of the combination of 5D fiber and the nominal design DC fiber of FIG. 1, curves 62 and 63 show the delay spectrum of the 5D fiber together with, respectively, DC fiber with 2% increased Δ and 2% decreased Δ, and curves 64 and 65 show the delay spectrum of the 5D fiber together with, respectively, DC fiber with 1% increased and decreased fiber outside diameter. All parameter variations are with respect to the exemplary nominal design. The results of FIG. 6 show that DC fiber according to the invention can substantially eliminate (e.g., about 3% residual delay) the delay of conventional transmission fiber over a significant spectral region (e.g., 30 nm) in the presence of significant parameter variations.

Figure 7:
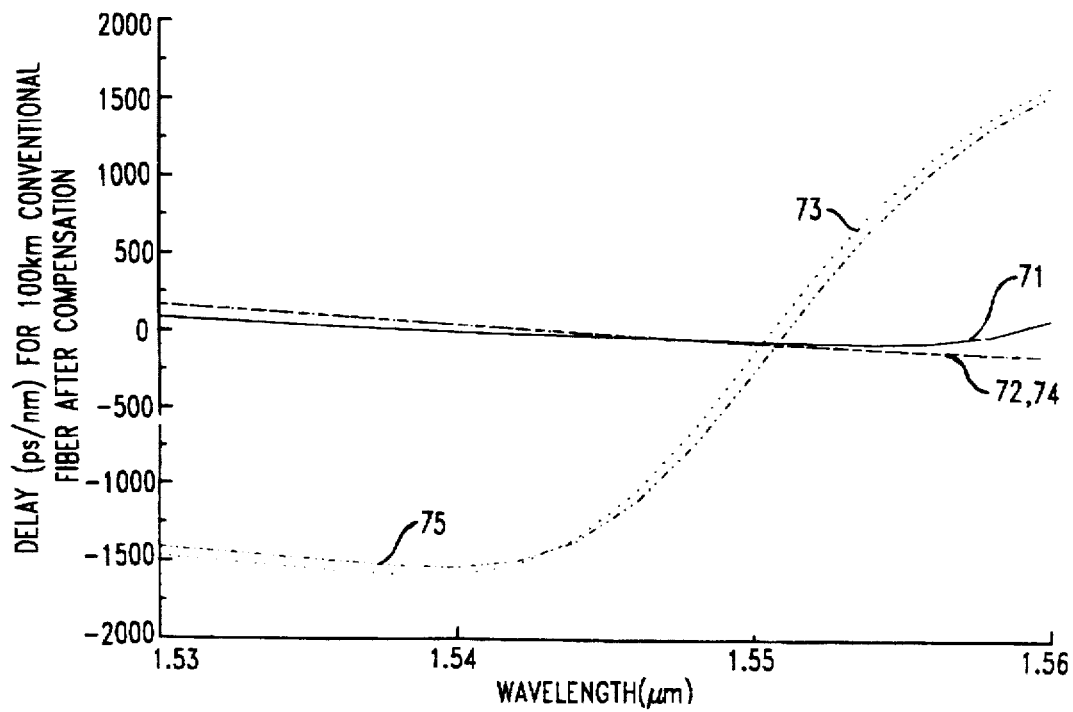
FIG. 7 shows data as in FIG. 6, except that the DC fiber is the exemplary prior art fiber of FIG. 5.

FIG. 7 shows corresponding data for the above discussed exemplary prior art DC fiber (7.1 μm core diameter, 1.8% Δ, step index core, no index ring). Curve 71 pertains to the nominal design, curves 72 and 73 pertain to Δ increased by 2% and decreased by 2%, respectively, and curves 74 and 75 pertain to outside diameter increased and decreased, respectively, by 1%. As can be seen, for decreased Δ and/or diameter, the delay is significant, and dispersion compensation is relatively ineffective.

Figure 8:
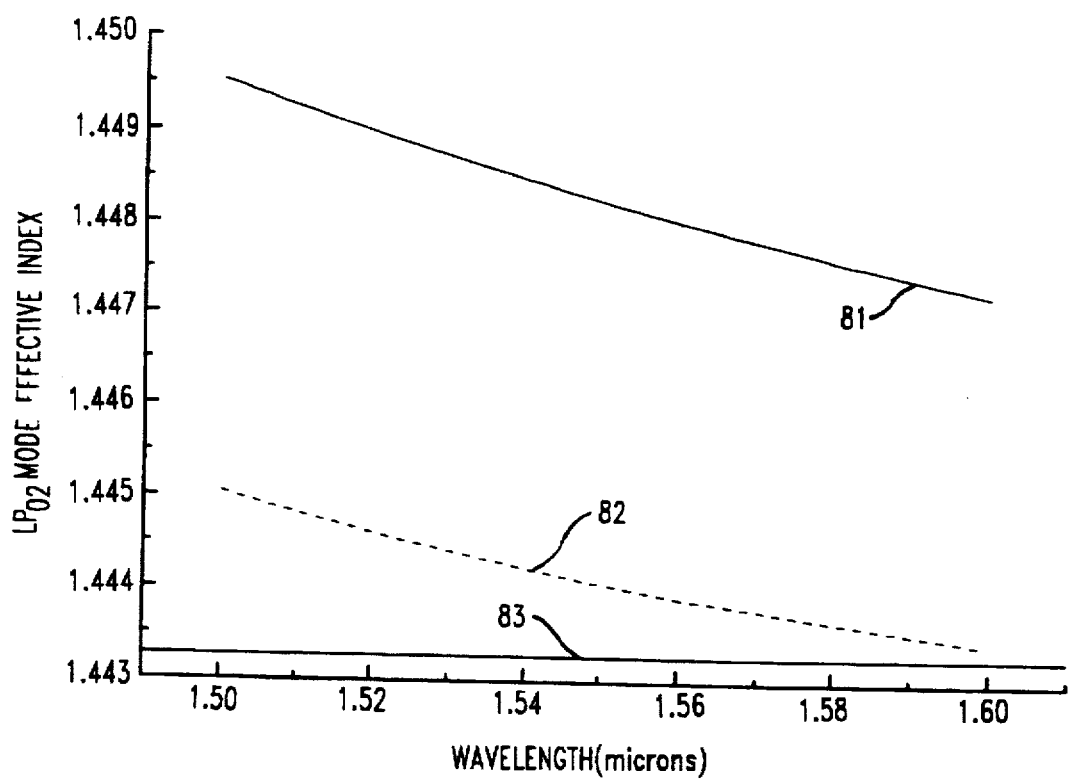
FIG. 8 shows data on $LP_{02}$ mode effective index for the DC fiber of FIG. 1 and the exemplary prior art DC fiber of FIG. 5.

A further advantage of preferred DC fiber according to the invention is relatively low bending loss, compared with at least some prior art DC fibers. FIG. 8 shows the $LP_{02}$ mode effective index as a function of wavelength, for the DC fiber of FIG. 1 (curve 81), and for the previously discussed prior art DC fiber (curve 82). Curve 83 is the refractive index of vitreous silica, the conventional outer cladding material. As can readily be seen, the difference between curves 82 and 83 is relatively small at any wavelength in the range 1.5 μm to 1.6 μm, indicative of susceptibility of the prior art fiber to bending loss. As can also be seen, the difference between curves 81 and 83 is relatively large (e.g., greater than 0.002) over the same spectral region, indicative of relatively low bending loss of the DC fiber according to the invention.

More generally, in preferred DC fibers according to the invention the nominal refractive index profile is selected such that, over the wavelength range $\lambda_{max}\pm50$ nm, $(n_{eff}-n_{1,nom})/n_{eff}$ is greater than 0.1 $\Delta_{nom}$ (λ), where $n_{eff}$ is the mode effective index of the $LP_{02}$ mode.

Those skilled in the art will know that, for a given fiber design and wavelength, the effective index of a given mode can be readily determined, as can other fiber properties such as dispersion. See, for instance, T. Lenahan, *Bell System Technical Journal*, Vol. 62, p. 2663 (1983), incorporated herein by reference.

The invention claimed is:

1. An article comprising a length of dispersion-compensating optical fiber that supports radiation of a predetermined wavelength $\lambda_o$ in a fundamental mode $LP_{01}$ and a higher order mode, wherein the dispersion-compensating fiber has a nominal refractive index profile including
    a) a core of diameter $d_{c,nom}$ and maximum refractive index $n_{c,nom}$; and
    b) an inner cladding region that contactingly surrounds the core and has refractive index $n_{1,nom}$ less than $n_{c,nom}$, with $(n_{c,nom}-n_{1,nom})/n_{c,nom}$ designated $\Delta_{nom}$; where
    c) at least a portion of the length of dispersion-compensating fiber has a refractive index profile that differs from the nominal refractive index profile and includes a core of diameter $d_c$ and maximum refractive index $n_c$, and further includes an inner cladding region that contactingly surrounds the core and has refractive index $n_1$, with $(n_c-n_1)/n_c$ designated Δ, where at least one of $d_c$, $n_c$ and Δ differ from $d_{c,nom}$, $n_{c,nom}$ and $\Delta_{nom}$, respectively; and where
    d) the dispersion-compensating fiber having said nominal refractive index profile has nominal dispersion $D_{nom}$ (λ), and said portion of the length of dispersion-compensating fiber has dispersion $D(\lambda) \neq D_{nom}$ (λ), where λ is the wavelength;

CHARACTERIZED IN THAT the nominal refractive index profile is selected such that
    e) the length of dispersion-compensating fiber supports $LP_{01}$ and at least a higher order mode $LP_{02}$ at $\lambda_o$, and $D_{nom}$ (λ) is more negative than −200 ps/nm.km over at least a wavelength range $\lambda_{max}\pm50$ nm, where $\lambda_{max}$ is the wavelength at which $|D_{nom}(\lambda)|$ is maximum;
    f) $|D(\lambda)-D_{nom}(\lambda)|$ is less than $|0.5\ D_{nom}(\lambda)|$ at every wavelength λ in the range $\lambda_{max}\pm50$ nm
        i) for $d_c$ that differs from $d_{c,nom}$ by 1% or less, or
        ii) for Δ that differs from $\Delta_{nom}$ by 2% or less, or
        iii) for $d_c$ that differs from $d_{c,nom}$ by 1% or less and Δ that differs from $\Delta_{nom}$ by 2% or less, where the vertical bars before and after a quantity indicate the absolute value of the quantity between the vertical bars;
    g) $\lambda_o$ is a wavelength in the range $\lambda_{max}\pm50$ nm; and
    h) the nominal refractive index profile is selected such that $D_{nom}$ (λ) is substantially all in $LP_{02}$.

2. Article according to claim 1, wherein $\lambda_o \leq \lambda_{max}$.

3. Article according to claim 1, wherein the nominal refractive index profile is selected such that $(n_{c,nom} \cdot d_{c,nom} \cdot \sqrt{\Delta_{nom}})/\lambda_o$ is greater than 0.55.

4. Article according to claim 1, wherein the nominal refractive index profile is selected such that, over the wavelength range $\lambda_{max}\pm50$ nm, $(n_{eff}-n_{1,nom})/n_{eff}$ is greater than 0.1 $\Delta_{nom}$ (λ), where $n_{eff}$ is an effective refractive index of the $LP_{02}$ mode.

5. Article according to claim 1, wherein the dispersion-compensating fiber is silica-based dispersion-compensating fiber comprising a Ge-doped core, an F-doped inner cladding that contactingly surrounds the core, and an undoped or Ge-doped refractive index ring that contactingly surrounds the inner cladding.

6. Article according to claim 1, wherein the article is an optical fiber communication system that comprises a transmitter for providing signal radiation of wavelength $\lambda_o$, a receiver for receiving the signal radiation, and an optical fiber transmission path for signal radiation-transmissively connecting the receiver and transmitter, wherein the optical fiber transmission path comprises said length of dispersion-compensating fiber.

7. Article according to claim 6, wherein $\lambda_o$ is approximately 1.55 µm.

8. Article according to claim 7, wherein the nominal refractive index profile of the dispersion-compensating fiber is furthermore selected such that the dispersion-compensating fiber provides dispersion slope compensation over a range of wavelengths greater than 10 nm, wherein $\lambda_o$ is in said range of wavelengths.

* * * * *